BEFORE CHARGING

AFTER CHARGING

*INVENTOR.*
HERBERT R. ANDERSON, JR.
BY
Allen A. Meyer, Jr.
ATTORNEY

United States Patent Office 3,441,939
Patented Apr. 29, 1969

3,441,939

THERMOPLASTIC RECORDING TECHNIQUE

Herbert R. Anderson, Jr., Pound Ridge, N.Y., assignor to International Business Machines Corporation, New York, N.Y., a corporation of New York Filed Sept. 2, 1964, Ser. No. 393,924
Int. Cl. G01d 9/00
U.S. Cl. 346—1 19 Claims

ABSTRACT OF THE DISCLOSURE

An improved thermoplastic recording technique is provided. An electrostatic charge is applied to a recording medium which deforms spontaneously to provide an image according to the distribution of the electrostatic charge. The image may be read optically. The recording medium is molecularly designed to control its molecular weight, molecular weight distribution and plasticity. The medium, so designed, has a glass transition which permits surface deformation thereof at or about room temperature. The heat developing step necessary in the prior art is eliminated in this invention.

This invention relates to polymeric compositions which are deformable upon application of electrostatic charge. More particularly, it relates to polymers whose unique combination of parameters (e.g., glass transition temperature, molecular weight, molecular weight distribution and degree of plasticization) render them spontaneously deformable when subjected to an electrostatic charge.

It is the usual practice in thermoplastic recording to apply a localized electrostatic charge by such means as an electron beam or corona discharge. Then surface deformations can be achieved by heating the composite article or recording medium, particularly the surface thereof with, for instance, direct application of heat or by heat generated by radio frequency energy acting on a conducting layer, whereby the heat causes only the charged thermoplastic layer to fuse or melt, and become liquid. When this happens, opposite charges attract to deform the surface of the thermoplastic layer into various depressions, hills, ridges, etc. Thereafter, the heated surface is rapidly cooled to set or solidify these hills, ridges, and other deformations in the thermoplastic layer. The recording medium thus treated can now be read or projected visually by passing a beam of light through it in cooperation with a special optical system for conversion into an image or can be optically converted to the desired information or data in the form of electrical signals. The image can be viewed directly, projected on a screen, transmitted electronically for viewing on a television screen elsewhere, or can be simply stored on film. A more complete description of the method for recording in the manner described above can be found in an article by William E. Glenn, Jr., in "Journal of Applied Physics," December 1959, pages 1870–1873. In addition, the elements of in-air recording using thermoplastics is described by H.G. Grieg, in an article entitled "An Organ Photoconductive System," RCA Review, vol. XXIII, page 413, September 1962.

Because the thermoplastic layer is capable of being heated to the liquid state (at which time it develops the surface deformations by action of the induced electric field on a charged portion of the liquid and the pattern of ripples thus produced become frozen into a permanent record by promptly cooling the liquid thermoplastic layer to the solid state), it is possible to employ such recording material many times over by merely subjecting the surface layer to the action of heat at a temperature high enough to cause fusion of the upper layer to a smooth surface, thus "erasing" the information stored in the aforesaid thermoplastic layer, In the ordinary practice of placing information on thermoplastics, the material is necessarily exposed to ionizing radiation and high temperatures. Both of these tend to degrade the polymer and alter its response to electrostatic forces. An approach that has been used by R. J. Brown et al. in U.S. patent application S.N. 248,737, now Patent No. 3,245,053, entitled "Method for Erasing a Thermoplastic Record," to reduce the extent of degradation to the polymer by temperature is a flooding of the deformed surface with electrostatic charge prior to the erasure step so that the erasure temperature can be reduced. However, this technique unduly exposes the recording medium to radiation degradation and doesn't remove the heat development step. It is desirable in many applications in thermoplastic recording to have a material which is capable of undergoing a large number of write-develop-erase cycles in order to update information on memories or project new images. The cumulative effect of polymer degradation during such cycling serves to determine the limit of reversibility. Excessive amounts of degradation thus should be avoided.

It has been discovered that the usual heat development step used in thermoplastic recording can be eliminated and the erasure temperature significantly reduced by concomitant adjustment of several polymer parameters of the recording medium. In addition to eliminating one step in the usual write-develop-erase cycle this invention materially reduces the thermal exposure of the recording medium. For a given polymer system with its intrinsic electrical properties, the glass transition temperature of the medium is adjusted such that the electrostatic forces produced during the charging process are capable of forming spontaneously long-lived surface deformations at room temperature. The glass transition temperature of the recording medium may be changed by adjusting the molecular weight, molecular weight distribution, and the type and amount of plasticizer.

An object of the invention is to prepare a polymeric composition which can be used as a thermoplastic layer for recording, storing and reproducing photographic images, technical data, etc.

Another object of the invention is to prepare a polymeric recording medium in which the thermoplastic layer of such medium is deformable upon application of an electrostatic charge.

Still, another object of the invention is to prepare a thermoplastic polymeric recording medium having a glass transition temperature such that the electrostatic forces produced during the charging process are capable of forming spontaneously long-lived surface deformations.

Further another object of the invention is to prepare a thermoplastic polymeric recording medium having a glass transition temperature which has been changed by adjusting the molecular weight, the molecular weight distribution, and the type and amount of plasticizer.

Another object is to prepare a thermoplastic polymeric recording medium with improved reversibility capabilities by limiting its exposure to temperature and radiation.

The foregoing and other objects, features and advantages of this invention will be apparent from the following more particular description of the preferred embodiments of the invention, as illustrated in the accompanying drawings, in which.

Figure 1A:
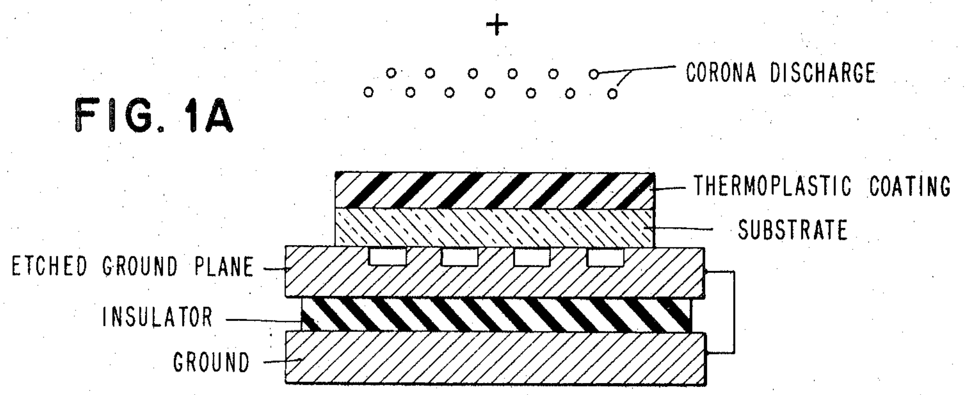
FIGURES 1A and 1B are diagrammatic illustrations of a technique used to deform a thermoplastic recording material at room temperature with an electrostatic charge.

In order for the recording medium to be suitably responsive, the electrical resistivity of the material comprising the medium can be in the range from $10^7$ to $10^{17}$ ohm centimeters (preferably for practical reasons the resistivity should be $10^{13}$ ohm centimeters). In writing on thermoplastics the initial electrostatic force decays exponentially as the temperature is raised during the development step. At the same time the viscosity of the medium decreases exponentially with temperature. Thus, during the development step a point is reached at which the residual electrostatic force is capable of overcoming the counteracting viscous force to deform the surface. The point at which glassy material becomes soft is called the glass transition temperature. It has been found experimentally that the temperature at which deformation takes place in thermoplastic recording is somewhat higher than the reported values of glass transition temperature (e.g. 10°–80° C.). In order for materials to deform at room temperature, the glass transition temperature for a given polymer system must be adjusted. Suitable adjustments can be made by altering the molecular weight, molecular weight distribution, type and amount of plasticizer. A compatible plasticizer can be either added to the polymer or a plasticizing entity incorporated into the polymer structure directly, to give an internally plasticized material.

Generally, a thermoplastic composition which deforms spontaneously upon the application of an electrostatic charge to produce long-lived deformations may be produced by adjusting the glass transition temperature. One way of doing this is to adjust the molecular weight of the polymer by synthetic techniques known to those skilled in the art (e.g. in free radical solution polymerization the degree of polymerization is controlled by the concentration of the monomer) the concentration of the free radical initiator, the temperature, and chain transfer agents. The artisan is guided by Equation 1

$$T_g = T_{g\infty} - K/M \quad (1)$$

which shows that the glass transition temperature ($T_g$) of a given polymer having an infinite molecular weight $$(T_{g\infty})$$

may be lowered by lowering the molecular weight (M). K is a proportionality constant. Such an adjustment has the additional beneficial effect of lowering the viscosity of the medium to reduce the opposition to electrostatic forces during development.

Another way to adjust the glass transition temperature of a given polymer in order to eliminate the heat development step in thermoplastic recording is to plasticize the polymer structure internally by techniques known to those skilled in the art (e.g. one may internally plasticize polystyrene by copolymerizing it with butadiene) or by addition of a diluent. Equation 2 serves as a guide when copolymerization (internal plasticization) techniques are used as a means to adjust the glass transition temperature.

$$\frac{1}{T_g} = \frac{W_1}{T_{g1}} + \frac{W_2}{T_{g2}} + \cdots \quad (2)$$

With a knowledge of the individual glass transition temperature ($T_{gi}$) and the weight fractions ($W_i$) of the components of a copolymer, terpolymer, etc., it is possible to synthesize a variety of thermoplastic materials which are within the embodiment of this invention.

As mentioned above, dilution of the polymer structure with a compatible plasticizer provides a means to adjust the glass transition-temperature. Adjustments such as these are guided by Equation 3.

$$T_g = [\alpha_p V_p T_{gp} + \alpha_d (1-V_p) T_{gd}] / [\alpha_p V_p + \alpha_d (1-V_p)] \quad (3)$$

where subscripts $p$ and $d$ refer to polymer and diluent, $\alpha$ is a volume expansion coefficient, V is the free volume, and T is the glass transition temperature. Thus, there is a lowering of the glass transition temperature of a polymer when its structure is diluted by a compatible plasticizer.

Since the response characteristics of a thermoplastic recording material are governed by its physical and electrical properties, one is able to optimize its response in recording by concomitant adjustment of the glass transition temperature, molecular weight and degree of plasticization. However, for extended reversibility the chemistry of the polymer must be arranged to minimize degradation due to radiation and thermal exposures. Thus, for example, the degree of internal plasticization becomes specified by the desired radiation resistance.

With the chemistry of the material thus specifid, a material can be made which will respond spontaneously upon application of electrostatic charge by adjusting the molecular weight and/or the molecular weight distribution.

One of the components of the thermoplastic composition may be selected from addition type polymers prepared from ethylenically unsaturated monomers. Typically suitable monomers include acrylyl and alkacrylyl compounds, e.g., acrylic haloacrylic, and methacrylic acids, esters, nitriles and amides such as acrylonitrile, methyl methacrylate, ethyl methacrylate, butyl methacrylate, octyl methacrylate, cyclohexyl methacrylate, methoxymethyl methacrylate, chloroethyl methacrylate, methacrylic acid, ethyl acrylate, calcium acrylate, and alphachloroacrylic acid; vinyl and vinylidene halides such as vinyl chloride, vinyl fluoride, vinylidene fluoride; vinyl carboxylates such as vinyl acetate, vinyl laurate, vinyl propionate, vinyl stearate; N-vinyl imides such as N-vinyl phthalimide and N-vinyl caprolactam; vinyl acyls such as styrene and other vinyl derivatives including vinyl pyrolidone. Mixtures of any two or more of the above monomers may also be utilized.

Other suitable ethylenically unsaturated monomers are:

| | |
|---|---|
| acrolein | methyl acrylate |
| acrylic anhydride | methyl vinyl ketone |
| allyl acetate | nitrostyrene |
| allyl acrylate | phenyl acrylate |
| allylamine | vinyl acetic acid |
| allylbenzene | vinyl benzoate |
| allyl chloride | vinylidene chloride |
| allyl glycidyl ether | vinyl naphthalene |
| acrylamide | benzyl methacrylate |
| acrylyl chloride | n-butyl acrylate |
| allyl acetone | iso-butyl acrylate |
| allyl alcohol | n-butyl methacrylate |
| allyl anthranilate | 2-chlorostyrene |
| allyl benzoate | cinnamyl methacrylate |
| allyl cinnamate | divinyl sulfide |
| allyl phenyl acetate | glycidyl acrylate |
| benzyl acrylate | isopropenyl acetylene |
| butadiene monoxide | methacrolein |
| sec-butyl acrylate | methacrylonitrile |
| tert-butyl acrylate | methyl styrene |
| 2-chloro-1,3-butadiene | nitroethylene |
| cinnamyl acrylate | pentadiene |
| divinyl benzene | triallylamine |
| glyceryl triacrylate | vinyl acrylate |
| isoprene | vinyl crotonate |
| isopropylstyrene | vinyl methacrylate |
| methacrylamide | vinyl phenylacetate |

Another class of thermoplastic organic polymers that may be used advantageously in the practice of this invention is the class prepared by condensation techniques. Condensation thermoplastic polymers are those polymers in which the molecular formula of the structural unit lacks certain atoms present in the monomers from which it is formed or to which it may be degraded by chemical means. Thermoplastic condensation polymers require the development of linear polymer molecules which have no capacity to form cross-linked rigid networks during polymerization. Typical examples may be found in classes of condensation polymers called polyesters, polyanhydrides, polysulfides, polyacetals, polyamides, and phenol-aldehyde polymers, urea-aldehyde polymers, polyurethanes, and polyurea.

Polyesters are derived from reacting a dibasic acid with a glycol. Typical dibasic acids are phthalic, maleic, fumaric, succinic, adipic, sebacic, azelaic, itaconic, and citraconic. Typical glyols are ethylene glyol, propylene glycol, 2,3-butanediol, 1,3-butanediol, and 1,4-butanediol.

Polyanhydrides are derived from dibasic acids. Typical dibasic acids are those shown above.

A method used to prepare polysulfides involves reacting an organic dichloride with sodium sulfide. Typical dichlorides are ethylene dichloride, 1,3-dichloropropane, 1,2-dichloropropane, 1,4-dichlorobutane, 1,2-dichlorobutane, 1,3-dichlorobutane, and 1,5-dichloropentane.

Polyacetals are derived from reacting glycols and diethers. Typical glycols 1,4-dihydroxybutane, 1,5-dihydroxypentane, 1,6-dihydroxyhexane, 1,8-dihydroxyoctane, and 1,10-dihydroxydecane. Typical ethers are dimethoxymethane, diethoxymethane, dipropoxymethane, and dibutoxymethane.

Polyamides are derived from reacting dicarboxylic acids with diamines. Typical dicarboxylic acids have been shown above. Typical diamines are 1,2-diaminoethane, 1,3-diaminopropane, 1,4-diaminobutane, 1,5-diaminopentane, and 1,6-diaminohexane.

Thermoplastic phenol-aldehyde polymers are derived from certain phenols and aldehydes. Typical phenols are 1-hydroxy, 4-methylbenzene, 1-hydroxy, 4-ethylbenzene, 1-hydroxy, 4-propylbenzene. Typical aldehydes are formaldehyde, acetaldehyde, propionaldehyde, and butyraldehyde.

The thermoplastic urea-formaldehyde polymers are prepared by reacting urea and formaldehyde in a one-to-one ratio. Other amines, e.g., thiourea, may be used to modify the properties of the urea-formaldehyde system.

Thermoplastic polyurethane polymers are derived from reacting a glycol with a diisocyanate in a one-to-one ratio. Typical glycols have been cited above. A typical disocyanate is tolylene-2,4-diisocyanate.

Thermoplastic polyurea polymers are derived from reacting an organic diamine with a diisocyanate in a one-to-one ratio. Typical examples of these classes of compounds have been cited above.

It is necessary to select a polymer and adjust its glass transition temperature by techniques mentioned previously. A list of typical glass transition temperatures for various homopolymers is shown in Table I.

TABLE I

| Polymer | $T_g$ ° C. | $T_g$ ° K. |
|---|---|---|
| Poly (Butadiene) | −85 | 188 |
| Natural Rubber | −72 | 201 |
| Poly (Lauryl methacrylate) | −65 | 208 |
| Poly (2-ethylhexyl acrylate) | −55 | 218 |
| Poly (Butyl acrylate) | −52 | 221 |
| Poly (Vinylidene fluoride) | −39 | 234 |
| Poly (Ethyl acrylate) | −22 | 251 |
| Poly (Octyl methacrylate) | −20 | 253 |
| Poly (Hexyl methacrylate) | −5 | 268 |
| Poly (Methyl acrylate) | 9 | 282 |
| Poly (Butyl methacrylate) | 20 | 293 |
| Poly (Vinyl acetate) | 29 | 302 |
| Poly (Propyl methacrylate) | 35 | 308 |
| Poly (Cyclohexyl methacrylate) | 58 | 331 |
| Poly (Ethyl methacrylate) | 65 | 338 |
| Poly (Vinyl chloride) | 82 | 355 |
| Poly (Acrylonitrile) | 97 | 370 |
| Poly (Styrene) | 100 | 373 |
| Poly (Methyl methacrylate) | 105 | 378 |

Conveniently, materials having glass transition temperatures between room temperature (25° C.) and 110° C. may be selected. However, this should not unduly restrict the scope of the invention since it is apparent that there are a number of polymers having glass transition temperatures outside this range and which when adequately plasticized would have the proper response to electrostatic forces at room temperature.

Preferably a material should be selected which has the electrical resistivity within the range previously quoted and a glass transition temperature higher than room temperature. It has been found that in the majority of cases, it is necessary to plasticize the materials having glass transition temperatures above room temperature. If an internally plasticized polymer is desired to avoid problems in compatibility and vapor pressure, then co-polymerization techniques can be employed. Suitable co-polymers may be made by combining two materials one of which has a glass transition temperature above room temperature and the other below room temperature.

Equation 2 may be employed in selecting the relative proportions of monomers to use to obtain a copolymer having a glass transition temperature near room temperature. It is understood from previous sections that the molecular weight of the copolymer has an influence on the actual glass transition temperature of the material. It has been found convenient to adjust simultaneously the level of plasticization and the molecular weight. Alternatively, the molecular weight of a polymer may be adjusted and subsequent to this a compatible plasticizer added to reduce the glass transition temperature to a point where the material will respond spontaneously at room temperature upon application of an electrostatic charge to produce long-lived deformations. Suitable plasticizers which may be used for the variety of polymers suggested earlier are listed in Table II.

TABLE II.—PLASTICIZERS

Abietates:
- Methyl abietate
- Hydrogenated methyl abietate

Adipates:
- di-(n-hexyl) adipate
- dicapryl adipate
- dioctyl adipate
- diisooctyl adipate
- diisodecyl adipate
- dinonyl adipate
- di-(butoxyethyl) adipate
- dicyclohexyl adipate Azelates:
- di-(2-ethylhexyl) 4-thioazelate
- diisobutyl azelate
- di-2-ethylhexyl azelate
- di-iso-octyl azelate
- di-2-ethylbutyl axelate Citrates: tributyl citrate Glycol and polyol esters:
- diethylene glycol dibenzoate
- dipropylene glycol dibenzoate
- glycerol triacetate
- glycerol tripropionate
- triethylene glycol diacetate
- triethylene glycol dipropionate
- triethylene glycol di-2-ethylbutyrate
- triethylene glycol di-2-ethylhexoate
- polyethylene glycol di-2-ethylhexoate Glycolates:
- methyl phthalyl ethyl glycolate
- ethyl phthalyl ethyl glycolate
- butyl phthalyl butyl glycolate Phosphates:
- triethyl phosphate
- tributyl phosphate
- tri-(butoxyethyl) phosphate

TABLE II.—PLASTICIZERS

- triphenyl phosphate
- tricresyl phosphate
- monophenyl-di-xenyl phosphate
- diphenyl mono-xenyl phosphate
- di-(t-(butylphenyl) mono-(t-butylcresyl) phosphate Phthalates:
- dimethyl phthalate
- diethyl phthalate
- dibutyl phthalate
- diamyl phthalate
- dihexyl phthalate
- di-(methylisobutylcarbinyl) phthalate
- butyl octyl phthalate
- butyl isohexyl phthalate
- di-(n-octyl) phthalate
- diisooctyl phthalate
- di-(2-ethylhexyl) phthalate
- n-octyl-n-decyl phthalate
- dicyclohexyl phthalate
- butyl cyclohexyl phthalate
- di-(methoxyethyl) phthalate
- di-(ethoxyethyl) phthalate
- di-(butoxyethyl) phthalate
- methylcyclohexyl isobutyl phthalate
- dibenzyl phthalate
- diphenyl phthalate
- butyl benzyl phthalate
- 2-ethylhexyl benzyl phthalate
- hexamethylene bis (2-ethylhexyl phthalate)
- diisodecyl 4,5-epoxytetrahydrophthalate
- diisodecyl phthalate Sebacates:
- dimethyl sebacate
- dibutyl sebacate
- dioctyl sebacate
- diisooctyl sebacate
- di-(2-ethylhexyl) isosebacate
- dibutyl isosebacate
- butyl benzyl sebacate
- dibenzyl sebacate Sulfonates and sulfonamides:
- ethyl p-toluenesulfonate
- o-cresyl p-toluenesulfonate
- p-toluenesulfonamide
- cyclohexyl p-toluenesulfonamide Miscellaneous:
- o-terphenyl
- tetrahydrofurfuryl oleate
- chlorinated paraffin
- benzyl benzoate
- ethyl acetanilide
- triphenyl guanidine
- diphenyl ether
- methyl pentachlorostearate
- camphor
- dibutyl tartrate It is apparent from the foregoing that the amount of plasticizer used is dependent on the characteristic glass transition temperature of the particular polymer of interest. For example, if the glass transition temperature is low, viz polyvinyl acetate, then smaller amounts of plasticizer are necessary to get the desired performance than in the case of a polymer with a high glass transition temperature viz polystyrene. Generally, the level of added plasticizer is in the range of 5 to 150 parts per 100 parts by weight of polymer. For the internally plasticized materials the level will be determined by the respective glass transition temperatures of the component parts. Generally, the level of internal plasticizer (materials with glass transition temperatures significantly below room temperature) will comprise 5–60% mole percent of the polymer composition.

Since most polymer systems are poly-dispersed (i.e., composed of a number of molecules which differ in size or molecular weight) and the low molecular weight fraction tends to plasticize the matrix, it is apparent from the foregoing that the scope of the invention includes those polymers having a distribution which emphasizes the low molecular weight fraction. It is the usual practice in polymer chemistry to express the ratio of the weight average molecular weight ($\overline{M}_w$) to the number average molecular weight ($\overline{M}_n$) as an index of the breadth of the distribution of molecular weights ($\overline{M}_w/\overline{M}_n=Q$). Preferably the value of Q (index of distribution of molecular weights) should be between 2 and 500. It is preferred also that the molecular weight distribution be adjusted by suitable means (e.g., precipitation techniques) to remove the high ends of the molecular weight distribution because this portion of the distribution has an inordinate influence on the viscosity of the medium. Thus, the presence of the high ends of the molecular weight distribution would reduce the flow properties of the material rendering it more viscous.

The backing material for the recording medium may be either a flexible composition or may be a rigid inflexible material. Examples of rigid materials which can be employed (keeping in mind that optical clarity, heat resistance, and radiation resistance are usually the required properties) are, for instance, glass (in the form of plates, slides, disks, etc.); unsaturated polyester resins (formed from the reactions of a polyhydric alcohol, such as ethylene glycol, diethylene glycol, propylene glycol, dipropylene glycol, etc., and an alpha-unsaturated alpha-beta-dicarboxylic acid or anhydride, for instance, maleic acid, maleic anhydride, fumaric acid, citraconic acid, etc.); combined with these unsaturated polyesters one may also incorporate such copolymerizable cross-linking ingredients, such as diallyl phthalate, diethylene glycol dimethacrylate, etc. One can also employ metals such as aluminum, nickel, chromium, etc., where the metal serves both as a conducting layer and as a reflective surface which can be read optically by reflection.

Examples of flexible materials which can advantageously be employed as the backing material are, for instance, polyethylene terephthalate (which can be obtained by the transesterification of esters of terephthalic acid with divalent alcohols, for example, ethylene glycol as shown in U.S. Patent 2,641,592—Hofrichter), such polyethylene terephthalate being sold by E. I. du Pont de Nemours and Company of Wilmington, Del., under the name of Mylar. A more refined grade of polyester terephthalic acid tape or film found highly appropriate as the basis for recording images (and which contains small intercondensed residues from dihydric alcohols, such as, propylene glycol-1,3 to reduce crystallinity) is sold under the name of Cronar.

Other backing materials which can be used advantageously because of its good heat resistance, strength, inertness and resistance to radiation are polycarbonate resins.

It will be apparent to those skilled in the art that other compositions may be employed as backing materials where the softening point is sufficiently high so as to allow heating of the thermoplastic layer without adversely affecting the base layer.

In many instances, there is interposed between the thermoplastic surface and the backing, a conducting layer which can be subjected to radio frequency energy as a means for heating the thermoplastic layer. This conducting layer acts as the layer which becomes charged beneath the thermoplastic layer and when the thermoplastic layer is heated to cause the thermoplastic material to become fluid and deformable, the deposits of opposite charges on the top of the thermoplastic layer are attracted to the charged conducting layer, thus deforming the thermoplastic surface of the film. Among such conducting layers (which should be thin enough to be optically clear if interposed between the base and the thermoplastic layer) may be mentioned the various metals, for instance, iron, chromium, tin, nickel, etc.; metallic oxides, such as stannic oxide, cuprous oxide, etc.; salts, for instance, cuprous iodide, etc. In using the conducting layer, it is essential that the layer of metal or metal compound applied to the base layer be no thicker than is required to obtain a transparent film thereon. For this reason, it has been found that the metal film is advantageously of the order of about 10 to 100 Angstroms (A.) or 0.0001 to 0.01 micron thick, and that it should have a resistivity of between 1,000 and 10,000 ohms per square centimeter for optimum radio frequency heating if that is the method used for developing the deformation pattern.

The thickness of the thermoplastic layer can vary widely but advantageously is approximately 4 to 40 microns thick. The base layer thickness can also vary widely as long as it has the proper electrical properties. The base layer can be from a few microns in thickness to as much as 50 to 400 microns or more in thickness.

The conducting layer is advantageously applied to the backing by well-known method of volatilizing the metal or metal compound in a vacuum at elevated temperatures and passing the backing in proximity to the vapors of the metal or metal compounds so as to deposit an even, thin, optically clear, adherent film of the metal or metal compound on the backing and preferably while the entire assembly is still under vacuum. One method for applying a metal salt conducting layer to the backing, e.g., polyethylene terephthalate, is found in U.S. Patent 2,756,165—Lyon. Thereafter, a solution of the thermoplastic composition is applied to the surface of the conducting layer, and the solvent evaporated to deposit a thin film of the thermoplastic composition on the conducting layer.

The particular solvents employed for the thermoplastic composition may be varied widely and will depend on the type of polymers and resinous composition employed in the mixture of ingredients. Included among such solvents are aromatic hydrocarbon solvents, e.g., toluene, xylene, benzene, etc. Solids weight concentrations of from 10 to 50 percent of the thermoplastic composition in the solvent are advantageously used.

Figure 1B:
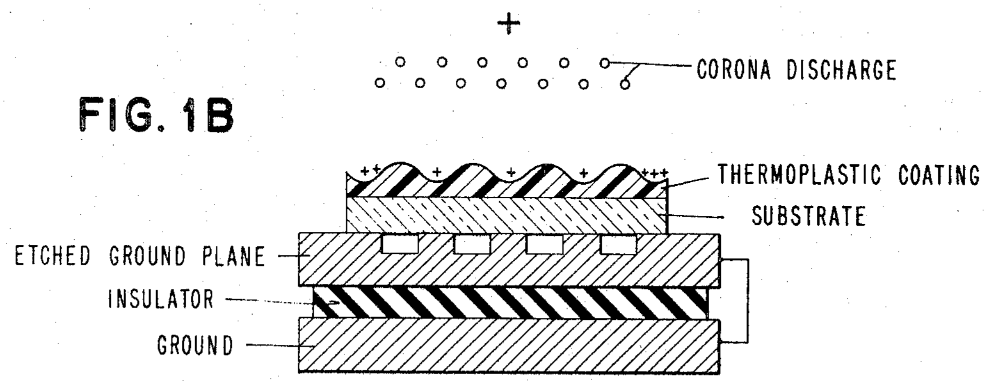

Another convenient way to place information on thermoplastics is shown in FIGURE 1 where no metallic coating is placed between the thermoplastic composition and the substrate. In this instance, the information is erased by a hot air pulse.

In order that those skilled in the art may better understand how the present invention may be practiced, the following examples are given by way of illustration and not by way of limitation. All parts and percents are by weight unless otherwise noted.

Free radical solution polymerization techniques were used to prepare most of the polymers. Other polymerization techniques could be used, however, the free radical solution polymerization technique was chosen because it minimized electrical resistivity problems associated with residual polymerization catalysts, specifically, $\alpha,\alpha'$-azodi-iso-butyronitrile (AIBN) was used as the polymerization catalyst. The usual practice for preparing the polymers is the following: The appropriate monomers were purified by vacuum distillation. The desired amounts of the purified monomers were added to seven ounce beverage bottles containing an appropriate amount of solvent, usually toluene and desired amount of catalyst. The contents of the bottle were purged with prepurified nitrogen for several minutes. Then the bottle was capped and inserted in a polymerization bath. Most of the polymerizations were carried out at 67° C. for a period of 48 hours. After which time the contents of the bottle were added dropwise to cold methanol which was refrigerated with a bath containing Dry Ice and acetone. The precipitated polymer was dried under vacuum conditions, then purified further by dissolving it in toluene and precipitating again in cold methanol. Appropriate benzene solutions of polymer and plasticizer were made to contain approximately 40% solids by weight. Other solvents and solids content could be used to provide the thermoplastic coating thickness desired (preferably in range of 5–40 microns). This solution was then applied to a polyethylene terephthalate base material 0.5 mil thick. Solvent removal was effected by drying in a nitrogen atmosphere at room temperature followed by complete removal of solvent in a vacuum oven.

*Example 1*

(A) A copolymer of styrene and isoprene was prepared using monomers purified by vacuum distillation techniques by combining 9 gms. of styrene and 1 gm. of isoprene, 80 ml. of toluene and 0.5 gm. of AIBN ($\alpha,\alpha'$-azodi-iso-butyronitrile). These reactants were placed in a seven ounce beverage bottle and freed of entrained oxygen by purging with prepurified nitrogen. After capping, the beverage bottle and contents were placed in a polymerization bath. The polymerization was conducted at 67° C. for a period of 48 hours. The polymer thus produced was recovered by adding the polymerization mixture dropwise to refrigerated methanol (−76° C.). The precipitant was decanted off and the remaining solvent in the polymer removed by drying in nitrogen at room temperature. Last traces of solvent were removed with the aid of a vacuum oven at room temperature. The polymer was then redissolved in toluene and reprecipitated in the same manner. After reprecipitation all entrained solvent was removed in the same manner as above. The polymer was then characterized according to its number average molecular weight ($\overline{M}_n$). This measurement was made with a Mechrolab Vapor Pressure Osmometer. Usually one gram of polymer was added to 2.5 ml. of toluene to determine the number average molecular weight by this technique. Using the above polymerization conditions, a styrene-isoprene copolymer was obtained having a number average molecular weight of 2490.

(B) The thermoplastic composition that deformed spontaneously upon application of an electrostatic charge was prepared by adding 40 parts of o-terphenyl to 100 parts of the aforementioned styrene-isoprene copolymer. This mixture was dissolved in benzene to make a solution containing 38% solids. A film was prepared from this solution by coating it on a 0.5 mil thick polyethylene terephthalate film base. The thickness of the dry thermoplastic coating was controlled by various drawing rods. The excess solvent was removed by drying in a nitrogen atmosphere at room temperature followed by a 1 hour period in a vacuum oven at room temperature. The dry coated substrate was then placed in an 85° C. oven for 15 minutes to remove any residual stresses.

(C) Referring to FIGURE 1, the annealed and dried coated substrate was placed on an etched stainless steel electrical ground plane. The etched pattern on the ground plane consisted of a grid network of lines with a line density of 250 lines per inch. The polyethylene terephthalate side of the composite film was in contact with this ground plane. The corona discharge apparatus was set to charge the thermoplastic composition to 1200 volts. The thus charged composite film was turned over, insulated from ground by a half inch of air and charged oppositely to the same voltage (1200 volts). Subsequent to charging, the deformations appear.

Figure 2:
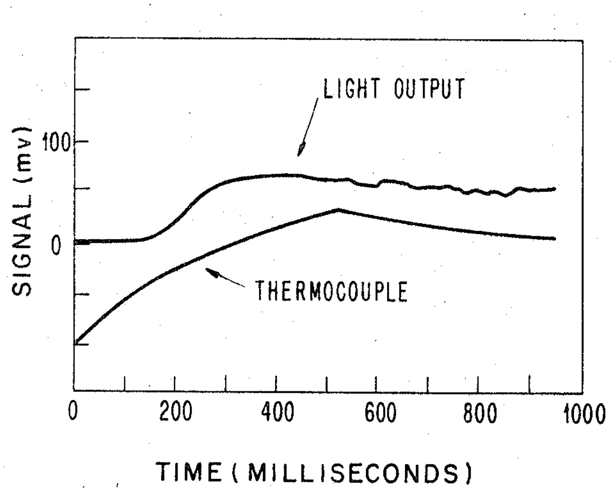
FIGURE 2 is a graphic representation of an oscilloscope trace of light output during annealing of a charged thermoplastic requiring heat development.
Figure 3:
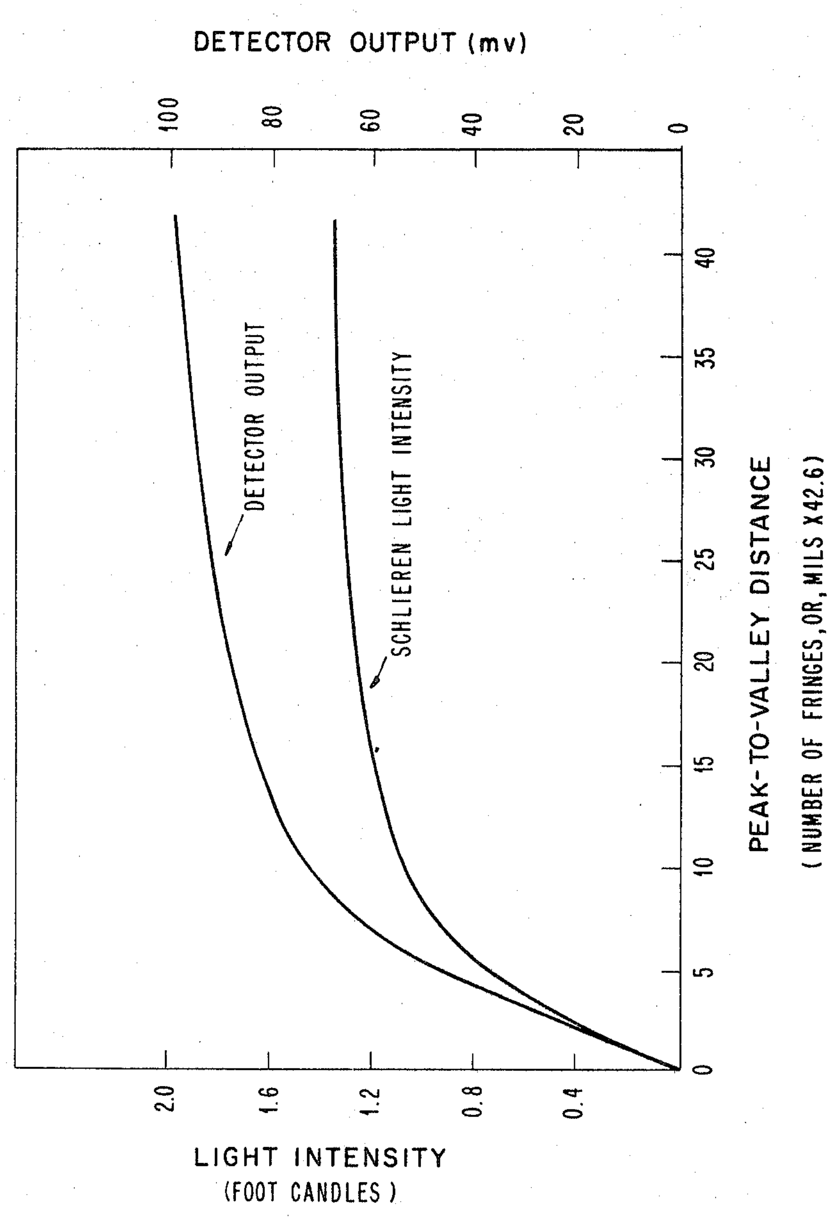
FIGURE 3 is graphic representation of the relationship of the schlieren light intensity as a function of the depth of the deformations.

Referring to FIGURE 2, thermoplastic compositions which require heat development were characterized by noting concomitantly the temperature of the film and the development of a schlieren optical signal with the aid of an oscilloscope. The same apparatus was used to measure the amount of light scattered by these room temperature deforming materials. The amplitude of the schlieren optical signal is a measure of the depth of deformation. FIGURE 3 shows a curve which correlates the detector output and schlieren light intensity with the depth of deformation. For this thermoplastic composition an optical signal of 50 millivolts was obtained.

*Examples 2–12*

The process of Example 1 is repeated except that the ingredients, proportions and operating conditions set forth below in Table III were used in the example indicated.

TABLE III

| Example Number | 2 | 3 | 4 | 5 | 6 | 7 | 8 | 9 | 10 | 11 | 12 |
|---|---|---|---|---|---|---|---|---|---|---|---|
| Polymerization Receipe: | | | | | | | | | | | |
| Styrene (gm.) | 9.00 | 9.50 | 7.00 | | 8.33 | 8.32 | | | | | |
| Isoprene (gm.) | 1.00 | 0.50 | 3.00 | | | | | | | | |
| n-Propylmethacrylate (gm.) | | | | 10.00 | | | | | | | |
| Hexylmethacrylate (gm.) | | | | | 3.40 | | | | | | |
| Octyl-decylmethacrylate (gm.) | | | | | | 4.24 | | | | | |
| α,α'-Azodi-iso-butyronitrile (gm.) | 0.50 | 0.50 | 0.50 | 0.50 | 0.80 | 0.80 | | | | | |
| Toluene (gm.) | 80.00 | 80.00 | 80.00 | 80.00 | 80.00 | 80.00 | | | | | |
| Polymerization temp. (° C.) | 67 | 67 | 67 | 67 | 67 | 67 | | | | | |
| Polymerization time (hrs.) | 48 | 48 | 48 | 48 | 48 | 48 | | | | | |
| Number average molecular weight ($\overline{M}_n$) | 2,490 | 2,590 | 1,270 | 7,140 | 3,550 | 3,680 | 3,310 | 3,310 | 3,310 | 3,310 | |
| Weight average molecular weight ($\overline{M}_w$) | | | | | | | | | | | 11,000 |
| Coating Compositions: | | | | | | | | | | | |
| Polymer (as indicated above) (gm.) | 100 | 100 | 100 | 100 | 100 | 100 | | | | | |
| Polystyrene (Dow PS-2) (gm.) | | | | | | | 100 | 100 | 100 | 100 | |
| Polyvinylacetate (Shawingan Gelva) (gm.) | | | | | | | | | | | 100 |
| o-Terphenyl (gm.) | | | 40 | 40 | 40 | 40 | | 70 | 100 | 120 | 40 |
| Tricresyl phosphate (gm.) | 40 | 40 | | | | | | | | | |
| Di-2-ethylbutyl azelate (gm.) | | | | | | | 40 | | | | |
| Test Results: | | | | | | | | | | | |
| Corona charging voltage (volts) | 1,200 | 1,200 | 1,200 | 1,200 | 1,200 | 1,200 | 1,200 | 1,200 | 1,200 | 1,200 | 1,200 |
| Deformation temp. (° C.) | 23 | 23 | 23 | 23 | 23 | 23 | 23 | 23 | 23 | 23 | 23 |
| Schlieren optical signal (millivolts) | 40 | (—*) | (—*) | 60 | (—*) | (—*) | 50 | 35 | 100 | (—*) | 100 |

*When schlieren optical signal was not measured the deformations were observed visually as a roughened surface.

It will be noticed in Examples 2–12 set forth in Table III that a variety of polymers and plasticizers may be combined to produce compositions which deform spontaneously at room temperature upon the application of an electrostatic charge. It will also be noticed that for the same charging conditions that a deeper deformation (as indicated by a higher optical signal) is obtained for a given polymer when it is plasticized to a higher level (compare Examples 9 and 10). It will also be noticed that for the same charging conditions when the glass transition temperature of the polymer (see Table I) is closer to room temperature that a lower level of plasticization is required (compare Examples 10 and 12).

*Example 13*

An internally plasticized polystyrene was prepared by copolymerizing styrene with octyl-decyl methacrylate which has a lower glass transition temperature than polystyrene. Internal plasticization is the addition of an entity to a polymer structure which serves to lower its glass transition temperature. This was accomplished by first purifying both styrene and octyl-decyl methacrylate by vacuum distillation techniques. 0.06 mole of styrene and 0.04 mole of octyl-decyl methacrylate were added to a 7 oz. beverage bottle containing 80 gm. of toluene and 0.8 gm. of α,α'-azodi-iso-butyronitrile. The contents of the bottle were freed of dissolved oxygen by purging with pre-purified nitrogen. After purging, the bottle was capped and placed in a polymerization bath. Polymerization was carried out at 67° C. for 48 hours, after which time, the polymer was recovered by adding the polymerization solution dropwise to methanol refrigerated at —76° C. The precipitating medium was decanted and the polymer dried in a vacuum oven. The polymer was then redissolved in toluene before precipitating it again in refrigerated methanol. After this polymer purification step, one gram of the material was dissolved in 2.5 ml. of benzene. A portion of this solution was placed on a 0.5 ml. thick poly ethylene terephthalate substrate and a drawing bar used to produce the desired coating thickness. Benzene was removed by drying at room temperature in a nitrogen atmosphere followed by a one hour period in a vacuum oven.

The composite of a styrene/octyl-decyl methacrylate coating and polyethylene terephthalate base film was subjected to the same test conditions as set forth in Example 1.

The process of Example 13 is repeated except that the ingredients, proportions and operating conditions set forth below in Table IV were used in the example indicated.

TABLE IV

| Example Number | 14 | 15 | 16 | 17 | 18 | 19 | 20 |
|---|---|---|---|---|---|---|---|
| Polymerization Receipes: | | | | | | | |
| Styrene (moles) | .07 | .065 | .060 | .062 | 0.3 | 0.28 | 0.08 |
| n-Hexyl methacrylate (moles) | | | | | | | 0.02 |
| Octyl-decylmethacrylate (moles) | .03 | .035 | .040 | .038 | | | |
| n-Decyl methacrylate (moles) | | | | | 0.2 | 0.22 | |
| Toluene (gm.) | 80 | 80 | 80 | 80 | 400 | 400 | 90 |
| α,α'-Azodi-iso butyronitrile (gm.) | 0.8 | 0.8 | 0.8 | 0.8 | 5.5 | 5.5 | 0.8 |
| Polymerization temp. (° C.) | 67 | 67 | 67 | 67 | 67 | 67 | 67 |
| Polymerization time (hrs.) | 48 | 48 | 48 | 48 | 48 | 48 | 48 |
| Number average molecular weight ($\overline{M}_n$) | 3,040 | 3,990 | 3,160 | 3,040 | 2,330 | 2,770 | 3,550 |
| Coating Compositions: | | | | | | | |
| Polymer (as indicated above) (gm.) | 100 | 100 | 100 | 100 | 100 | 100 | 100 |
| o-Terphenyl (gm.) | | | | | | | 40 |
| Test Results: | | | | | | | |
| Corona charging voltage (volts) | 1,200 | 1,200 | 1,200 | 1,200 | 1,200 | 1,200 | 1,200 |
| Deformation temp. (° C.) | 130 | RT | RT | RT | RT | RT | RT |
| Schlieren optical signal (millivolts) | 60 | 50 | 48 | (*) | 25 | 25 | (*) |

*When schlieren optical signal was not measured the deformations were observed visually as a roughened surface.

It will be noticed in Examples 14–20 set forth in Table IV that as the level of internal plasticization is increased, i.e., the mole percent of the methacrylates, that the thermoplastic material changes from one requiring a heat development step to one that deforms spontaneously at room temperature upon the application of an electrostatic charge to form long-lived surface ripples. The presence of deformations was detected with a schlieren optical system. As indicated earlier, the detector output (FIGURE 3) is a measure of the depth of deformations. It can be seen also from Table IV that for the same copolymer composition that octyl-decyl methacrylate more effectively internally plasticizes styrene than n-decyl methacrylate (Examples 16 and 18).

Thus it has been shown that this invention relates to a variety of compositions which may be admixtures of a variety of polymers and plasticizers or specially prepared co-, ter-, and higher polymers which have proper electrical properties and which have their molecular weight, molecular weight distribution, type and level of plasticizer concomitantly adjusted to provide materials having a predetermined glass transition temperature which makes it possible for thermoplastic compositions to deform spontaneously at room temperature upon the application of an electrostatic charge to produce long-lived deformations.

While the invention has been particularly shown and described with reference to preferred embodiments thereof, it will be understood by those skilled in the art that various changes in form and details may be made therein without departing from the spirit and scope of the invention.

What is claimed is:

1. A process for recording information in the form of deformations in a polymeric thermoplastic composition which is capable of reproducing the information which comprises:

(a) providing on a substrate a polymeric thermoplastic composition whose glass transition temperature has been lowered to a point such that upon application of sufficient electrostatic charge said thermoplastic composition physically deforms spontaneously;

(b) developing on said polymeric thermoplastic composition an electrostatic charge pattern having a field intensity distribution manifestation of an image of information.

2. A process for recording information in the form of deformations in a polymeric thermoplastic composition which is capable of reproducing the information which comprises:

(a) providing on a substrate a polymeric thermoplastic composition whose average molecular weight has been reduced sufficiently to lower its glass transition temperature to a point such that upon application of sufficient electrostatic charge said thermoplastic layer physically deforms spontaneously; and then (b) developing an electrostatic charge pattern on said polymeric thermoplastic composition to manifest data.

3. A process for recording information in the form of deformations in a polymeric thermoplastic composition which is capable of reproducing the information which comprises:

(a) providing on a substrate a polymeric thermoplastic composition whose plasticization level has been raised sufficiently to lower the glass transition temperature to a point such that upon application of sufficient electrostatic charge said thermoplastic layer physically deforms spontaneously; and then (b) developing an electrostatic charge pattern on said polymeric thermoplastic composition to manifest data.

4. The process of claim 3 wherein a compatible plasticizer has been included in said thermoplastic composition to raise the level of plasticization.

5. A process for recording information in the form of deformations in a polymeric thermoplastic composition which is capable of reproducing the information which comprises:

(a) providing on a substrate a polymeric thermoplastic composition comprising a copolymer of at least two polymerizable monomers at least one having a glass transition temperature less than room temperature and in adequate proportions to raise the level of internal plasticization sufficient to lower the glass transition temperature of the copolymer to a point such that upon application of sufficient electrostatic charge said thermoplastic composition physically deforms spontaneously; and then (b) developing an electrostatic charge pattern on said polymeric thermoplastic composition to manifest data.

6. A process for recording information in the form of deformations in a polymeric thermoplastic composition which is capable of reproducing the information which comprises:

(a) providing on a substrate a polymeric thermoplastic composition having a molecular weight distribution with a sufficient proportion of low molecular weight polymer molecules to lower the glass transition temperature to a point such that upon application of sufficient electrostatic charge said thermoplastic composition physically deforms spontaneously; and then (b) developing an electrostatic charge pattern on said thermoplastic composition to manifest data.

7. A process for recording information in the form of deformations in a polymeric thermoplastic composition which is capable of reproducing the information which comprises:

(a) providing on a substrate a polymeric thermoplastic composition whose average molecular weight has been reduced sufficiently and having a molecular weight distribution with an adequate proportion of low molecular weight polymer molecules to lower the glass transition temperature to a point such that upon application of sufficient electrostatic charge said thermoplastic composition physically deforms spontaneously; and then (b) developing an electrostatic charge pattern on said polymeric thermoplastic composition to manifest data.

8. A process for recording information in the form of deformations in a polymeric thermoplastic composition which is capable of reproducing the information which comprises:

(a) providing on a substrate a polymeric thermoplastic composition whose average molecular weight has been reduced sufficiently and whose plasticization level has been raised sufficiently to lower the glass transition temperature to a point such that upon application of sufficient electrostatic charge said thermoplastic layer physically deforms spontaneously; and then (b) developing an electrostatic charge pattern in said polymeric thermoplastic composition to manifest data.

9. The process of claim 8 wherein a compatible plasticizer has been included in said thermoplastic composition to raise the level of plasticization.

10. A process for recording information in the form of deformations in a polymeric thermoplastic composition which is capable of reproducing the information which comprises:

(a) providing on a substrate a polymeric thermoplastic composition whose average molecular weight has been reduced sufficiently and comprising a copolymer of at least two polymerizable monomers at least one having a glass transition temperature less than room temperature and in adequate proportions to raise the level of internal plasticization sufficient to lower the glass transition temperature of the copolymer to a point such that upon application of sufficient electrostatic charge said thermoplastic composition physically deforms spontaneously; and then (b) developing an electrostatic charge pattern on said thermoplastic composition to manifest data.

11. A process for recording information in the form of deformations in a polymeric thermoplastic composition which is capable of reproducing the information which comprises:

(a) providing on a substrate a polymeric thermoplastic composition whose plasticization level has been raised sufficiently and having a molecular weight distribution with a sufficient proportion of low molecular weight polymer molecules to lower the glass transition temperature to a point such that upon application of sufficient electrostatic charge said thermoplastic composition physically deforms spontaneously; and then (b) developing an electrostatic charge pattern on said polymeric thermoplastic composition to manifest data.

12. The process of calim 11 wherein a compatible plasticizer has been included in said thermoplastic comparison to raise the level of plasticization.

13. A process for recording information in the form of deformations in a polymeric thermoplastic composition which is capable of reproducing the information which comprises:

(a) providing on a substrate a polymeric thermoplastic composition having a molecular weight distribution with a sufficient proportion of low molecular weight polymer molecules and comprising a copolymer of at least two polymerizable monomers at least one having a glass transition temperature less than room temperature and in adequate proportions to raise the level of internal plasticization sufficient to lower the glass transition temperature of the copolymer to a point such that upon application of sufficient electrostatic charge said thermoplastic composition physically deforms spontaneously; and then (b) developing an electrostatic charge pattern in said thermoplastic composition to manifest data.

14. A process for recording information in the form of deformttions in a polymeric thermoplastic composition which is capable of reproducing the information which comprises:

(a) providing on a substrate a polymeric composition whose average molecular weight has been reduced sufficiently whose plasticization level has been raised sufficiently and having a molecular weight distribution with a sufficient proportion of low molecular weight polymer molecules to lower the glass transition temperature to a point such that upon application of sufficient electrostatic charge said thermoplastic composition deforms spontaneously; and then (b) developing an electroplastic charge pattern on said thermoplastic composition to manifest data.

15. The process of claim 14 wherein a compatible plasticizer has been included in said thermoplastic composition to raise the level of plasticization.

16. A process for recording information in the form of deformations in a polymeric thermoplastic composition which is capable of reproducing the information which comprises:

(a) providing on a substrate a polymeric composition whose average molecular weight has been reduced sufficiently having a molecular weight distribution with a sufficient proportion of low molecular weight polymer molecules and comprising a copolymer of at least two polymerizable monomers at least one having a glass transition temperature less than room temperature and in adequate proportions to raise the level of internal plasticization sufficient to lower the glass transition temperature of the copolymer to a point such that upon application of sufficient electrostatic charge said thermoplastic composition physically deforms spontaneously; and then (b) developing an electrostaitc charge pattern in said polymeric thermoplastic composition to manifest data.

17. A process for recording information in the form of deformations in a copolymer of styrene and octyldecyl methacrylate which is capable of reproducing the information which comprises:

(a) providing on a polyethylene terephthalate substrate a copolymer of 65 mole percent styrene and 35 mole percent octyl-decyl methacrylate having a number average molecular weight of 3990, said copolymer exhibiting a low enough glass transition temperature that the copolymer physically deforms spontaneously upon application of electrostatic charge; and then (b) developing an electrostatic charge pattern on said copolymer to manifest data.

18. A process for recording information in the form of deformations in a polystyrene thermoplastic composition which is capable of reproducing the information which comprises:

(a) providing on a polyethylene terephthalate substrate polyestyrene having a number average molecular weight of 3310 and 100 parts of o-terphenyl per 100 parts of polystyrene said composition exhibiting a low enough glass transition temperature that the composition physically deforms spontaneously upon application of electrostatic charges; and then (b) developing an electrostatic charge pattern on said composition to manifest data.

19. A process for recording information in the form of deformations in a copolymer of styrene and n-hexyl methacrylate which is capable of reproducing the information which comprises:

(a) providing on a polyethylene terephthalate substrate a copolymer of 80 mole percent of styrene and 20 mole percent n-hexyl methacrylate having a number average molecular weight of 3550 and 40 parts of o-terphenyl per 100 parts of copolymer, said copolymer exhibiting a low enough glass transition temperature that the copolymer physically deforms spontaneously upon application of electrostaitc charges; and then (b) developing an electrostic charge pattern on said composition to manifest data.

References Cited

UNITED STATES PATENTS

| | | | |
|---|---|---|---|
| 3,195,110 | 7/1965 | Nail | 340—173 |
| 3,262,122 | 7/1966 | Fleisher et al. | 346—1 |
| 3,268,906 | 8/1966 | Mast | 346—1 |
| 3,286,025 | 11/1966 | Ingersoll | 340—173 X |

BERNARD KONICK, *Primary Examiner.*

JOSEPH F. BREIMAYER, *Assistant Examiner.*

U.S. Cl. X.R.

250—49.5; 340—173; 346—74, 77